(12) United States Patent
Leyva (10) Patent No.: US 12,208,472 B1
(45) Date of Patent: Jan. 28, 2025

(54) ELEMENT ROTATING SYSTEM

(71) Applicant: Luis Angel Leyva, Fontana, CA (US)

(72) Inventor: Luis Angel Leyva, Fontana, CA (US)

( * ) Notice: Subject to any disclaimer, the term of this patent is extended or adjusted under 35 U.S.C. 154(b) by 289 days.

(21) Appl. No.: 17/863,744

(22) Filed: Jul. 13, 2022

(51) Int. Cl.
*B23K 37/053* (2006.01)
*B23K 101/04* (2006.01)

(52) U.S. Cl.
CPC ...... *B23K 37/0538* (2013.01); *B23K 2101/04* (2018.08)

(58) Field of Classification Search
CPC .................................................. B23K 37/0538
USPC .................................. 414/433; 269/289 MR
See application file for complete search history.

(56) References Cited

U.S. PATENT DOCUMENTS

| | | | | |
|---|---|---|---|---|
| 2,854,941 A * | 10/1958 | Vollmer | ............. | B23K 37/0536 269/130 |
| 3,325,026 A * | 6/1967 | Benedick | ........... | B23K 37/0538 474/139 |
| 3,963,231 A * | 6/1976 | Cooper | .............. | B23K 37/0538 269/130 |
| 4,098,415 A * | 7/1978 | Mason | .................... | B66C 1/125 414/781 |
| 5,934,626 A * | 8/1999 | Collins, Jr. | ........ | B23K 37/0538 269/289 MR |
| 6,988,719 B2 * | 1/2006 | Ursell | ................... | B23Q 3/105 269/282 |
| 9,222,614 B2 * | 12/2015 | Noe | ....................... | B01F 35/421 |
| 10,500,668 B2 | 12/2019 | Yoshida et al. | | |
| 10,843,286 B2 | 11/2020 | Kishikawa et al. | | |
| 10,843,302 B2 * | 11/2020 | Watkins | .............. | B23K 37/047 |
| 11,185,952 B2 | 11/2021 | Takata et al. | | |
| 2006/0278622 A1 | 12/2006 | Inoue et al. | | |
| 2008/0106018 A1 * | 5/2008 | Bellavance | ........ | B23K 37/0533 269/57 |
| 2014/0356113 A1 * | 12/2014 | Schmidt | ................. | B65G 47/82 414/800 |

OTHER PUBLICATIONS

Techtongda, Techtongda Tank Turning Rolls Linkage Roller Welding Support Positioner Roller Welder Rotator 80~1100 mm/min 110V with 2000LB Capacity and Range 50-600mm for Pipeline Welding, Amazon.com, Jul. 12, 2022, Amazon.

* cited by examiner

*Primary Examiner* — Mark C Hageman
(74) *Attorney, Agent, or Firm* — The Law Office of Austin Bonderer, PC; Austin Bonderer (57) ABSTRACT

The element rotating system allows a user to cause and control the rotation of an item, often used for welding. The element rotating system has a first positioner having a first wheel and a securing element coupling, a drive comprising a drive wheel and a control unit, and a securing element configured to couple an item to the first positioner. The drive wheel is configured to cause at least the first wheel to rotate. The control unit controls the drive wheel, and the securing element coupling is configured to selectively secure the securing element.

21 Claims, 11 Drawing Sheets

ELEMENT ROTATING SYSTEM

FIELD

The subject matter herein generally relates to a welding support positioner typically used with a linear item of some length that needs to be welded. Often the item will be piping or rods.

BACKGROUND

Welds must be made during the fabrication of many items. The fabrication often requires the joining of two sub-parts, of substantial size, into a single, effectively seamless element. This process can quickly become unwieldy. The element rotating system allows the user to support the sub-parts and, in some cases, causes the rotation of the sub-parts/item.

BRIEF DESCRIPTION OF THE DRAWINGS

Implementations of the present technology will now be described, by way of example only, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale, and the proportions of certain parts may be exaggerated to better illustrate details and features. The description is not to be considered as limiting the scope of the embodiments described herein. It should be noted that references to "an" or "one" embodiment in this disclosure are not necessarily to the same embodiment, and such references mean at least one.

Several definitions that apply throughout this disclosure will now be presented.

The term "coupled" is defined as connected, whether integral with, directly attached, or indirectly attached through intervening components, and is not necessarily limited to physical connections. The connection can be such that the objects are permanently connected or releasably connected. The term "electrically coupled" is defined as being in structural electrical contact, whether directly or indirectly through intervening components, to allow the flow of electrons between the respective elements. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder but can have one or more deviations from a true cylinder. The term "comprising" means "including, but not necessarily limited to"; it specifically indicates open-ended inclusion or membership in a so-described combination, group, series, and the like.

The present disclosure is described in relation to an element rotating system 100.

Figure 1:
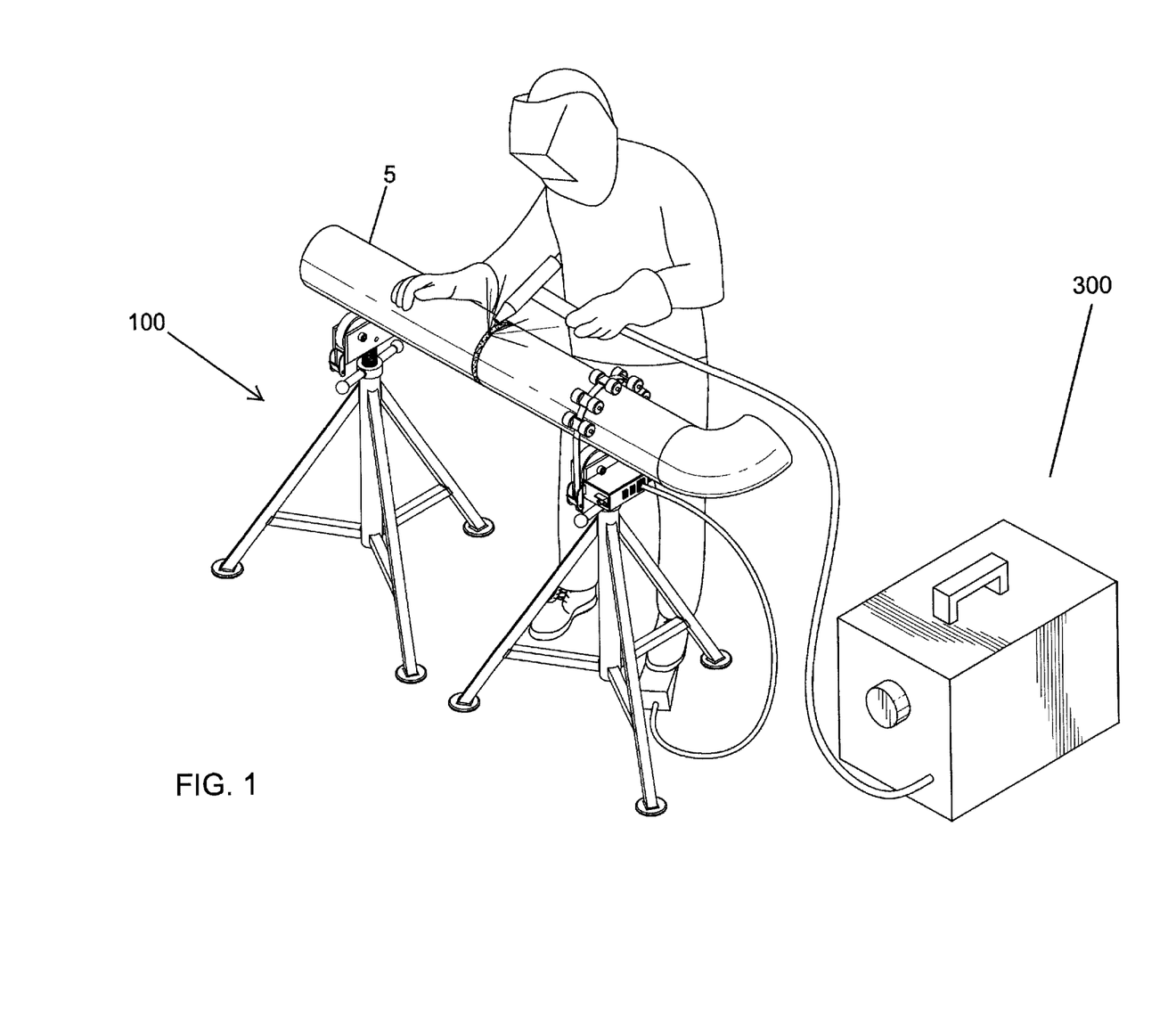
FIG. 1 shows an embodiment of the element rotating system in use.

FIG. 1 illustrates an element rotating system 100 used by a user using a welding machine 300 to weld an item 5.

Figure 2:
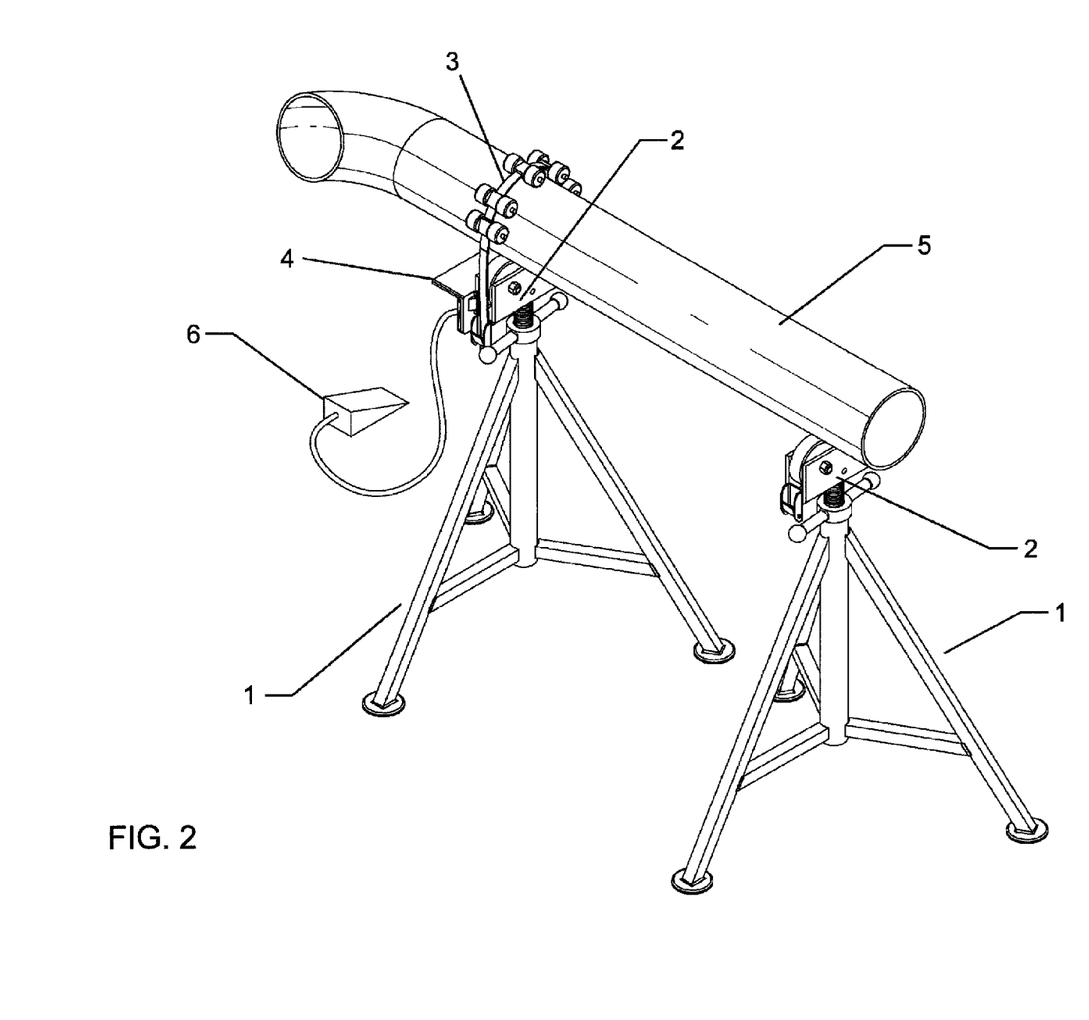
FIG. 2 shows an embodiment of the element rotating system.

FIG. 2 illustrates an element rotating system 100 and an item 5. In some embodiments, the element rotating system 100 comprises a stand 1, positioner 2, a securing element 3, and a drive 4. Some embodiments also comprise a controller 6. In some embodiments, the item 5 rests on two or more positioners 2. In some embodiments, each positioner 2 is coupled to a stand 1. In some embodiments, at least one securing element 3 wraps around the item 5 to secure it to a positioner 2. In some embodiments, the drive wheel 41 will rotate, which will, in turn, cause the rotation of the item 5. In some embodiments, a drive 4, or multiple drives 4, will be attached to one or more of the positioners 2. The drive 4 is configured to cause one or more of the wheels 21 to rotate. In some embodiments, the drive wheel 41 only engages one wheel 21, in others, it engages multiple wheels 21. The rotation of one or more wheels 21 will apply motion to the item 5. In some embodiments, a securing element 3 is strapped over the item 5. The securing element 3 can help to better secure the item 5 to the positioner 2 and to help translate the movement of the wheels 21 to the item 5. While it is shown in the figures that the securing element 3 is secured to a positioner 2 that is coupled to the drive 4, it is to be understood that the multiple securing elements 3 can be used with one or more of the positioners 2, whether or not a drive 4 is coupled thereto. In some embodiments, the controller 6 is a foot pedal that will allow the user to manage the rotation speed and/or direction with their feet, leaving their hands free to focus on welding. As mentioned before, there can be one or more drives 4 coupled to one or more positioners 2, and the controller 6 can control any or all of the drives 4. In some embodiments, with multiple drives 4, the drives are electrically coupled, in wireless communication, or a combination thereof, with the multiple drives 4 and/or the controller 6. The multiple drives 4 can work together and can be synchronized with each other in that their speeds match and/or that they can work together to maintain a constant speed of the item 5. In some embodiments, the multiple drives 4 are in communication such that when one drive 4 is unable to keep constant rotation due to some reason, the other drives 4 are able to compensate. In some embodiments, the controller 6 can communicate with one drive 4 and the additional drives 4 are able to communicate with that one drive 4.

Figure 3:
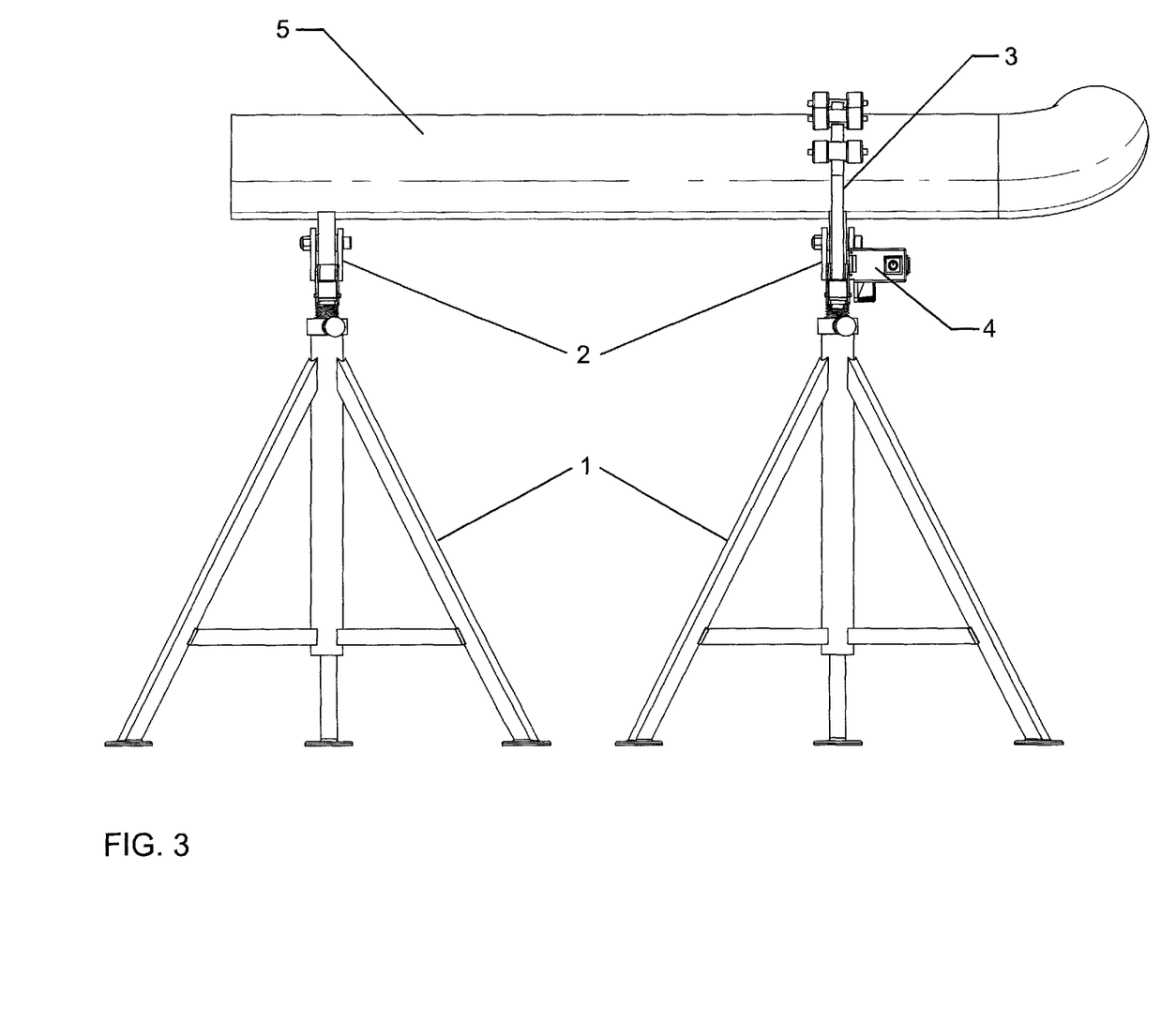
FIG. 3 shows an embodiment of the element rotating system in a level condition.

FIG. 3 illustrates an embodiment of the element rotating system 100 with an item 5. As can be seen, each stand 1 holds a positioner 2, and the positioners 2 are substantially aligned with each other. In some embodiments, the positioners 2 are coupled to their respective stand 1 in a manner that allows the user to alter the height of the positioner 2 in relation to the stand 1. This can be useful when a surface is not level and/or to accommodate some awkward designs of the item 5 (e.g., an offset bend).

Figure 4:
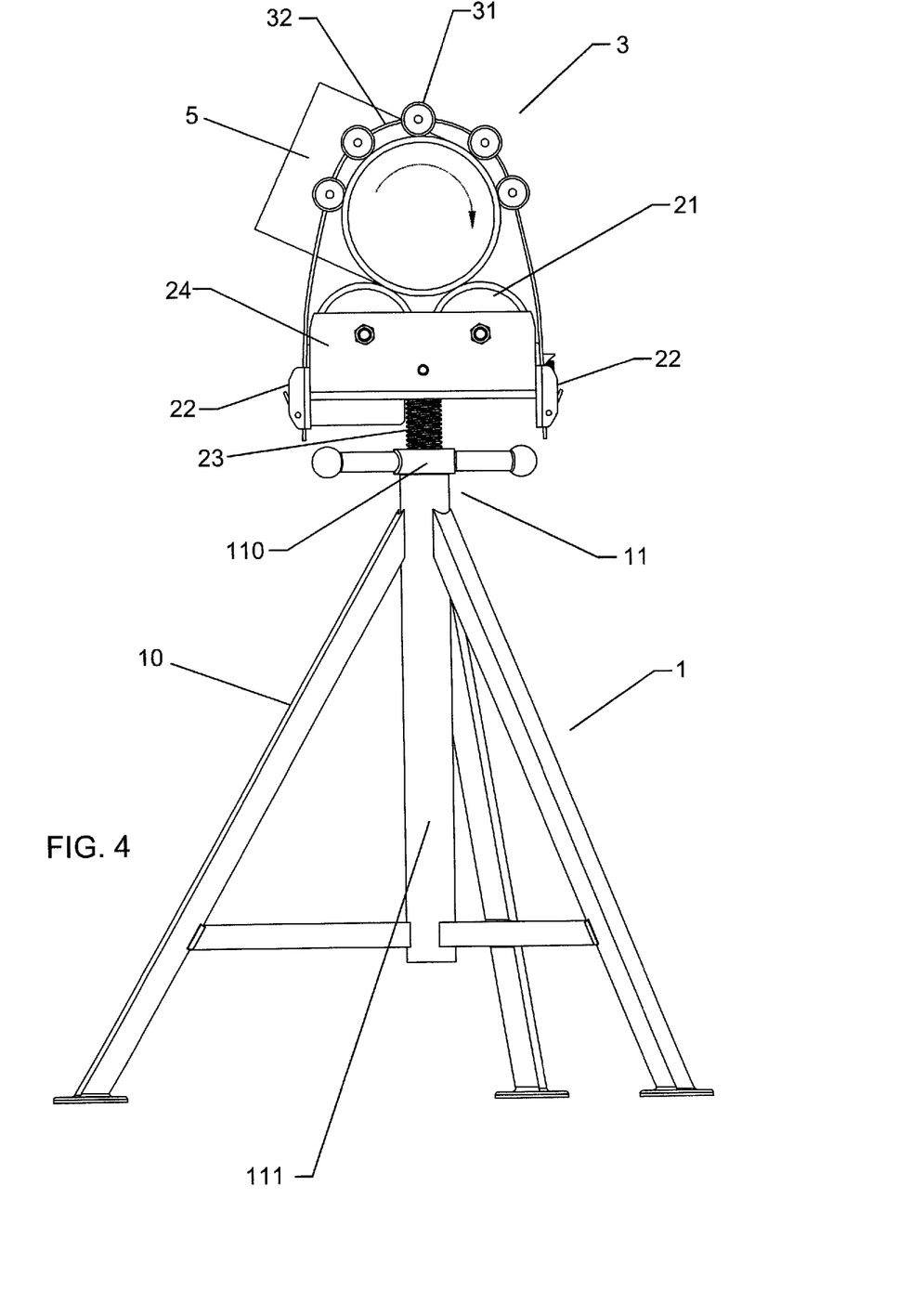
FIG. 4 shows an embodiment of the element rotating system in use and causing the rotation of an item.

FIG. 4 illustrates an embodiment of the element rotating system 100 comprising embodiments of the positioner 2, the securing element 3, and the stand 1. In some embodiments, the positioner 2 comprises one or more securing element coupling 22. The securing element coupling 22 allows the user to couple the securing element 3 to the positioner 2. In some embodiments, there are two securing element couplings 22 located on either side of the positioner 2. In some embodiments, there will be one securing element coupling 22. The other end of the securing element 3 is permanently, semi-permanently, or integral with the positioner 2, and the free end of the securing element 3 can engage the securing element coupling 22. This will allow the user to tighten the securing element 3 about the item 5. In some embodiments, the securing element coupling 22 is a cam buckle. In some embodiments, there are two securing element couplings 22 and they are of differing designs.

In some embodiments, the positioner 2 comprises a positioner rod 23. In some embodiments, the positioner rod 23 is threaded along some or all of its length. In some embodiments, the positioner rod 23 comprises an acme screw. The positioner rod 23 is configured to couple with the stand 1. In some embodiments, the positioner rod 23 and the stand 1 are configured to allow the user to adjust the height of the positioner 2. In some embodiments, the stand 1 defines a stand opening 111 in which the positioner rod 23 is configured to be inserted at least partially inside therein.

In some embodiments, the securing element 3 comprises bearings 31 located along a strap 32. The length of the strap 32 and the number of bearings 31 can be determined as needed. In some embodiments, the strap 32 is a woven material, chain, fabric, natural products, plastics, or a combination thereof. In some embodiments, the strap 32, allows a user to adjust the number and/or location of the bearings 31. The bearings 31 are configured to abut the item 5, but still allow the item 5 to rotate. In some embodiments, the bearings 31 are substantially cylinder-shaped elements. In some embodiments, the bearings 31 comprise two bearing wheels 310 that are joined together by an axle 311. In some embodiments, the bearings 31 are able to rotate independently of each other. In some embodiments, only the strap 32 abuts the item 5, and in some embodiments, the strap 32 comprises a coating and/or surface configured to reduce friction with the item 5.

In some embodiments, the stand 1 comprises a base 10 and a positioner coupler 11 that couples with the positioner 2. In some embodiments, the positioner coupler 11 comprises a positioner adjuster 110. In some embodiments, the positioner adjuster 110 is a threaded collar that is able to engage the thread of the positioner rod 23. When the threaded collar is rotated, it will move the positioner 2 up or down, depending on the direction of rotation.

Figure 5:
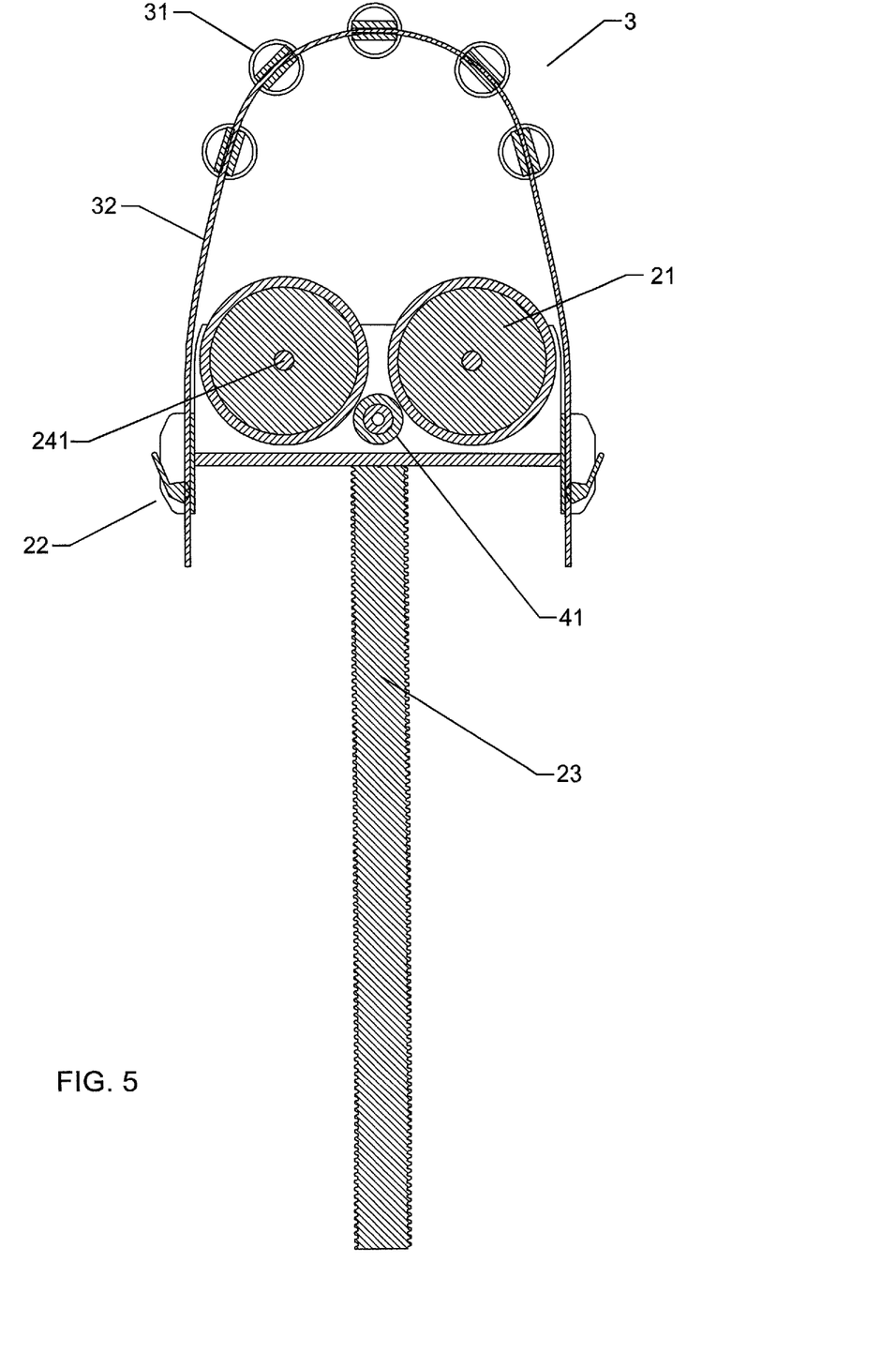
FIG. 5 shows an embodiment of a positioner and an embodiment of a securing element.

FIG. 5 illustrates an embodiment of the element rotating system 100. In some embodiments, the drive 4 engages one or more of the wheels 21 with one or more drive wheels 41. In some embodiments, the drive wheel 41 engages one or more of the wheels 21. In some embodiments, the drive wheel 41 engages the item engaging face of one or more of the wheels 21. In some embodiments, the one or more of the wheels 21 comprise gears that are offset and are engaged by the drive wheel 41 which also comprises gears that are engaged with the gears of the wheels 21. In some embodiments, the outside of the wheels 21 comprises a material that is configured to increase the friction between the wheels 21 and the item 5. In some embodiments, the material is rubber, plastic, an elastomer, a coating, natural materials, or a combination thereof. In some embodiments, the wheels 21 are uniform; in some embodiments, the wheels 21 are not uniform; and/or comprise two or more layers. In some embodiments, the outside of the drive wheel 41 comprises a material that is configured to increase the friction between the drive wheel 41 and the wheels 21. In some embodiments, the material is rubber, plastic, an elastomer, a coating, natural materials, or a combination thereof. In some embodiments, the drive wheel 41 are uniform; in some embodiments, the drive wheel 41 is not uniform and/or comprises two or more layers.

Figure 6:
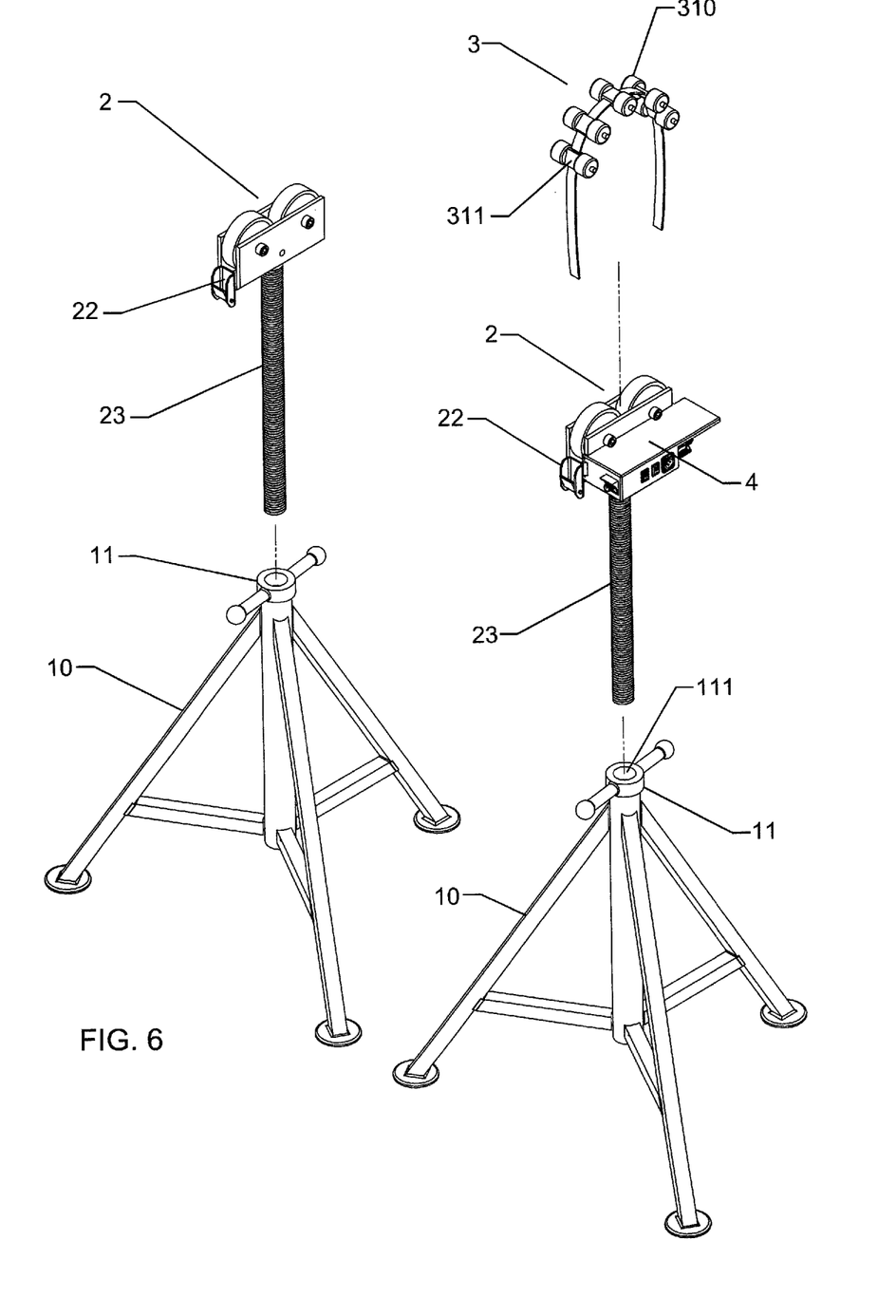
FIG. 6 shows an embodiment of the element rotating system in exploded view.

FIG. 6 illustrates an embodiment of the element rotating system 100 with a drive 4 coupled to one of the positioners 2. In some embodiments, the drive 4 is permanently coupled, semi-permanently coupled, or integral with the positioner 2.

Figure 7:
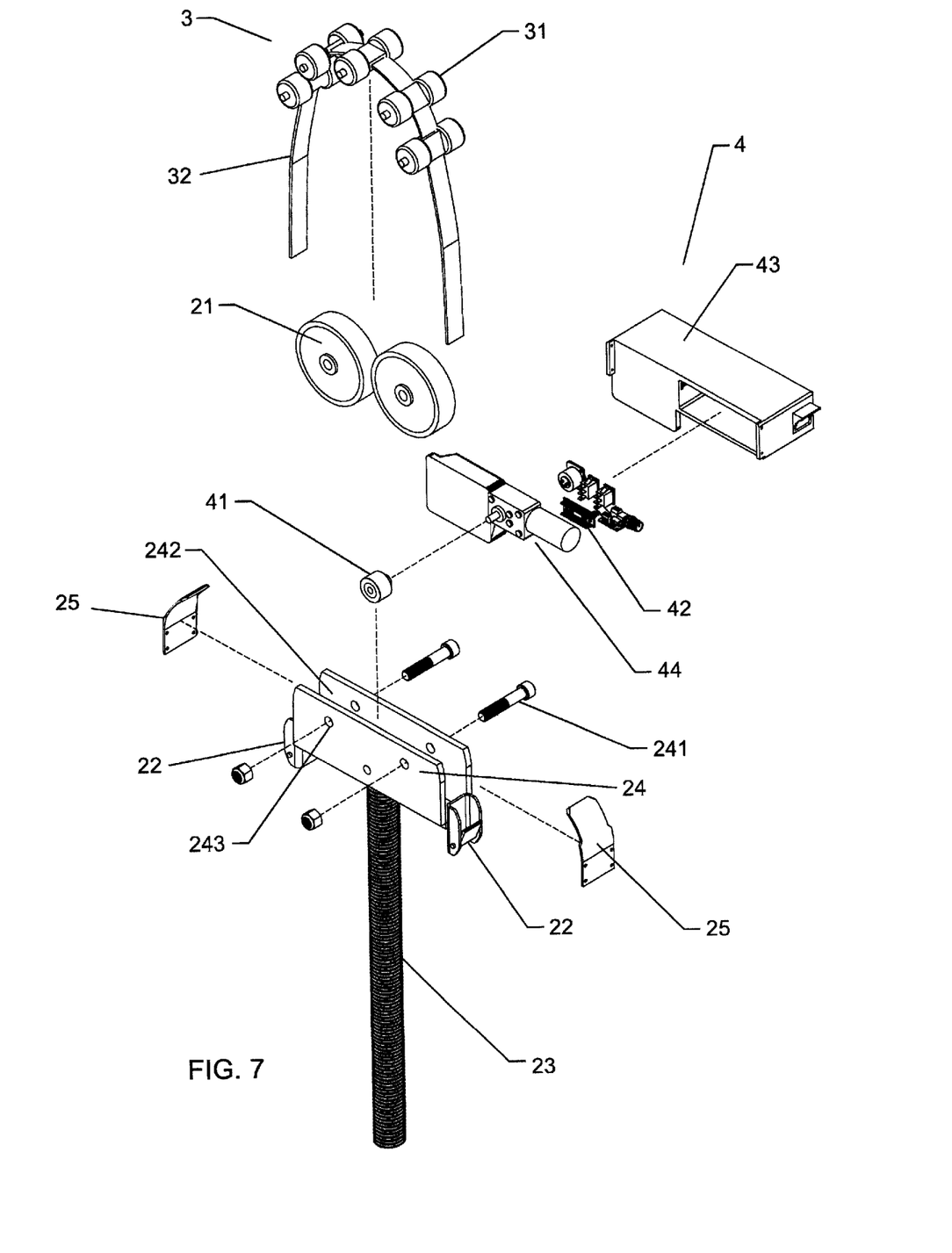
FIG. 7 shows an embodiment, in an exploded view, of a positioner and an embodiment of a securing element.

FIG. 7 illustrates an embodiment of the element rotating system 100. In some embodiments, the drive 4 comprises a housing 43, a motor 44, and a control unit 42. In some embodiments, the positioner 2 comprises two positioner plates 24 that define a wheel space 242. In some embodiments, a user can insert different size wheels 21. The user can remove the wheels 21 by removing the wheel axle 241, replacing the wheel 21, and resecuring the wheel axle 241 in the appropriate hole 243. Wheels 21 of varying sizes can be used when dealing with items 5 of differing circumferences. In some embodiments, the wheels 21 are of differing size. When inserting wheels 21 of differing sizes, the size of the drive wheel 41 used and/or the location of the drive wheel 41 can also be adjusted. It is also to be understood that adapters that would translate movement from the drive wheel 41 to one or more of the wheels 21 could also be used.

In some embodiments, the drive 4 is configured to sense when a load is offset which will alter the rotational speed of the item 5. The drive 4 can have sensors that can sense substantially instantaneously if the weight or moment of the item 5 is causing either acceleration or deceleration in which the drive 4 is able to adjust the drive wheel 41 so that the item 5 maintains the selected speed. In some embodiments, there are multiple drives 4, and the drives 4 can communicate with each other to provide feedback to one another and/or maintain a substantially constant speed of rotation.

Figure 8:
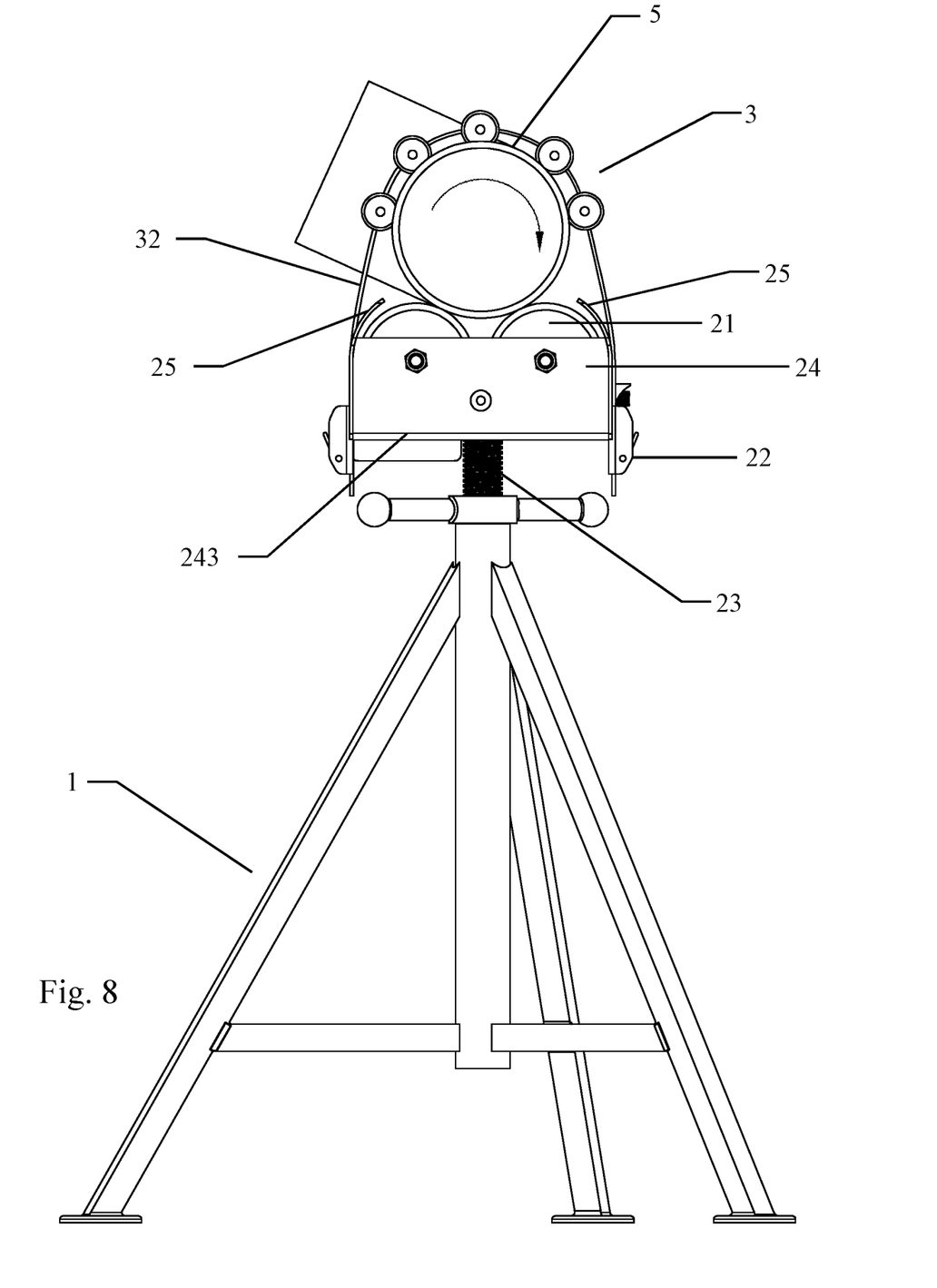
FIG. 8 shows an embodiment of the element rotating system comprising an embodiment of spacers.
Figure 9:
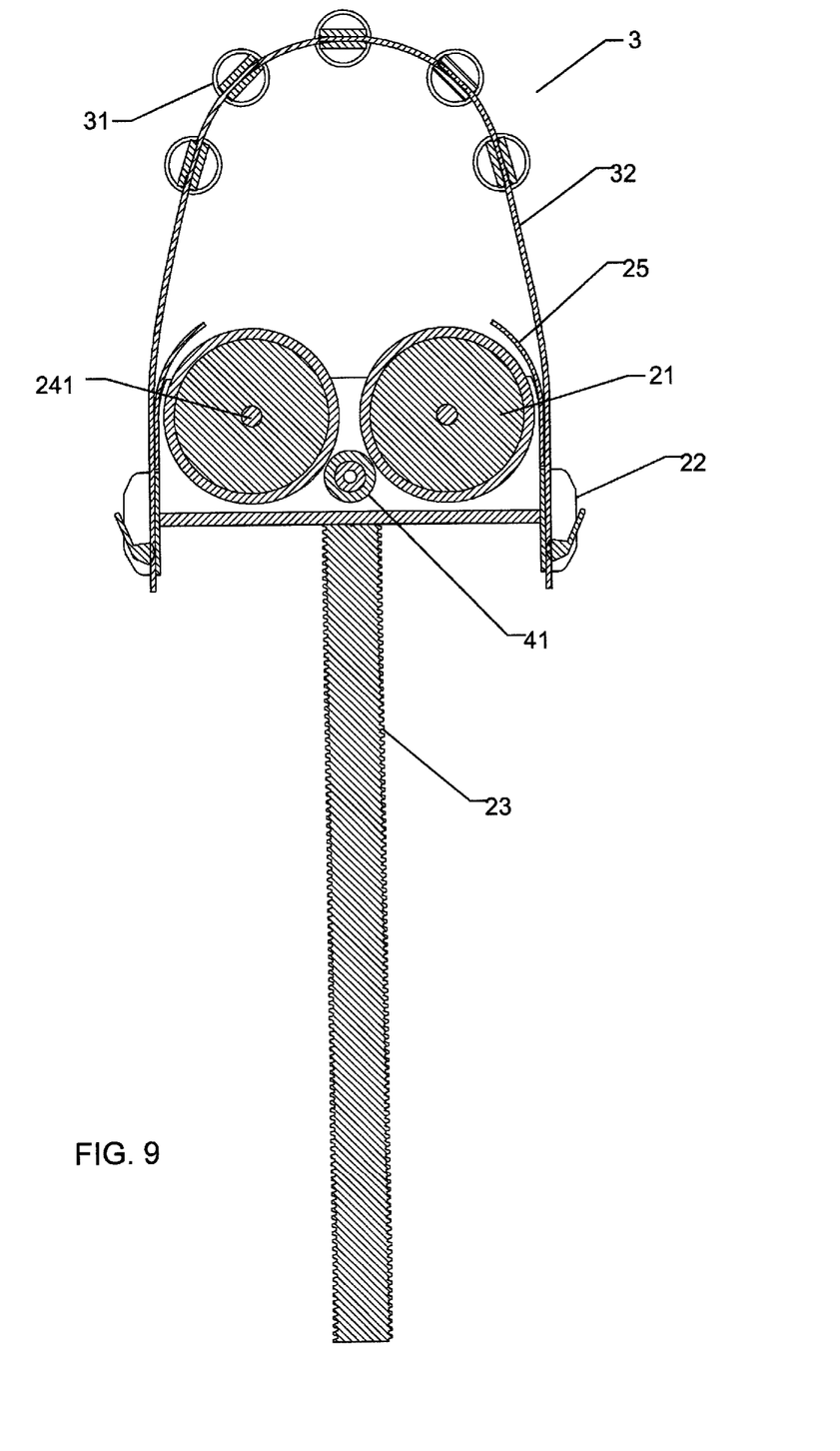
FIG. 9 shows a cross-section of an embodiment of the positioner and an embodiment of the securing element.

FIGS. 8 and 9 illustrate embodiments of the element rotating system 100. In some embodiments, the element rotating system 100 comprises one or more spacers 25. There may be times when the securing element 3 would unwantedly abut against one or more of the wheels 21. In embodiments comprising a spacer 25, the spacer 25 is able to prevent the securing element 3 abutting the wheels 21. In some embodiments, the spacers 25 are linear elements. In some embodiments, the spacers 25 are rounded elements. In some embodiments, the spacers 25 will extend up and curve in a protective manner above the wheels 21. In some embodiments, the spacers 25 will extend to force the securing element 3 away from the wheels 21. In some embodiments, the spacers 25 will extend out from the positioner 2 at an angle at, or between, 0 to 90 degrees.

Figure 10A:
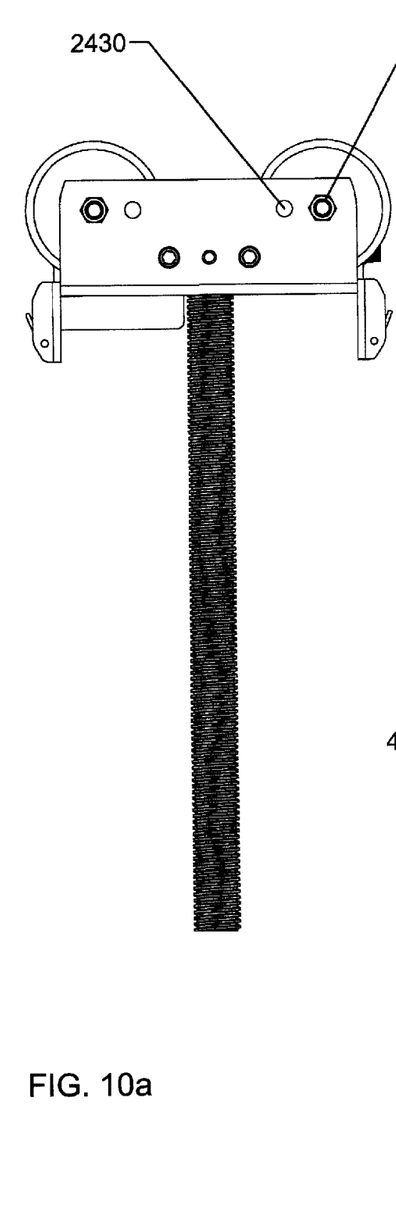
FIG. 10a shows an embodiment of the positioner.

FIG. 10*a* shows an embodiment of the positioner 2 having multiple holes 243 (and 2430) so the user can change the wheel's 21 location. In use, the user can switch out for different size wheels 21 and/or change the location of the wheels 21 as needed.

Figure 10B:
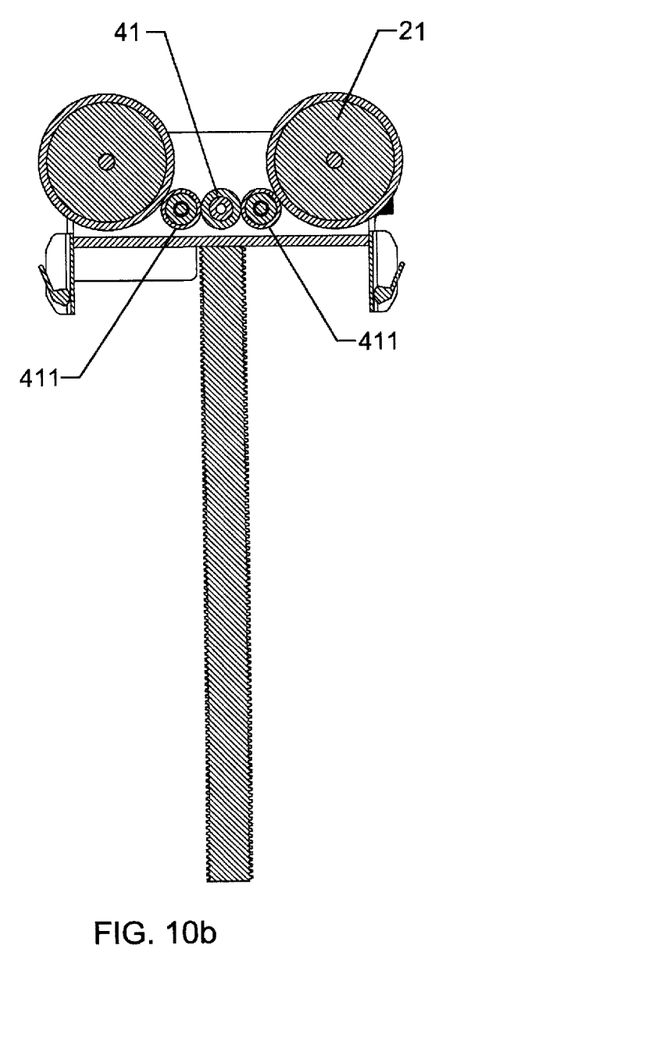
FIG. 10b shows a cross-section of an embodiment of the positioner.

FIG. 10*b* shows an embodiment comprising of drive wheel extenders 411. In some instances and/or embodiments, the wheels 21 may not be able to abut the drive wheel 41 directly and the use of drive wheel extenders 411 which will translate movement of the drive wheel 41 to one or more of the wheels 21. In some embodiments, the outside of one or more of the drive wheel extenders 411 comprises a material that is configured to increase the friction between drive wheel extenders 411 and the wheels 21. In some embodiments, the material is rubber, plastic, an elastomer, a coating, natural materials, or a combination thereof. In some embodiments, drive wheel extenders 411 are uniform; in some embodiments, the drive wheel extenders 411 are not uniform and/or comprise two or more layers.

Figure 11:
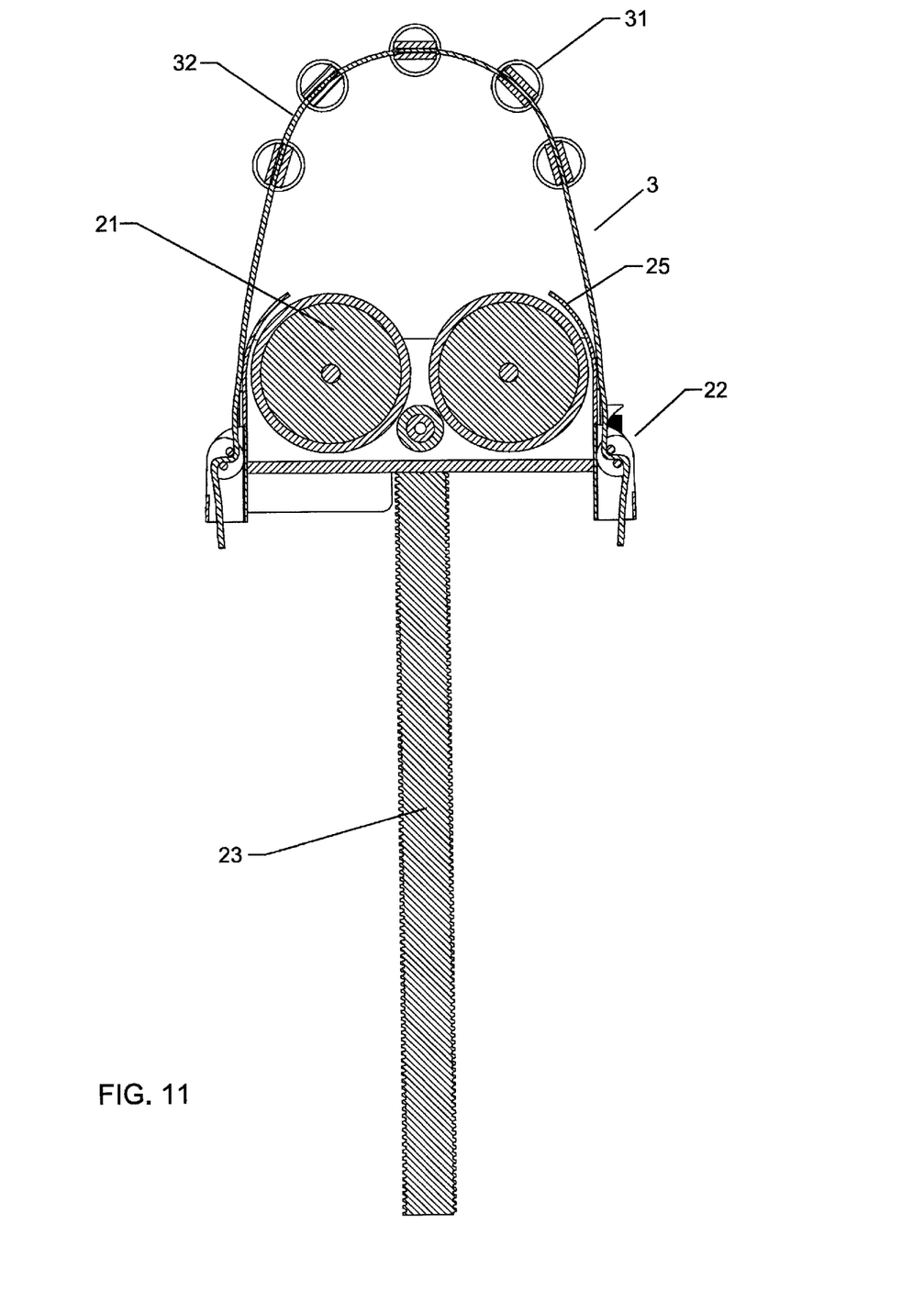
FIG. 11 shows a cross-section of an embodiment of the positioner.

FIG. 11 shows an embodiment of the positioner 2, wherein the securing element coupling 22 comprises a ratcheting element configured to secure the strap 32 and increase the tension of the strap 32. In some embodiments, the securing element coupling 22 is configured to allow the user to increase the tension of the strap 32. In some embodiments, the securing element coupling 22 is configured to allow the user to increase the tension of the strap 32 through a mechanical device that increases the mechanical advantage of the user. In some embodiments, the securing element coupling 22 comprises an electronic device that will increase the tension at the user's direction. In some embodiments, the securing element coupling 22 is configured to increase the tension to a predetermined tension automatically. In some embodiments, the securing element coupling 22 comprises a cleat. In some embodiments, the securing element coupling 22 is configured to maintain the tension to a predetermined level automatically.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

It should also be noted that elements of embodiments may be described in reference to the description of a particular embodiment; however it is disclosed that elements of disclosed embodiments can be switched with corresponding elements of embodiments with the same name and/or number of other disclosed embodiments.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. An apparatus comprising:
a first positioner comprising a first wheel and a securing element coupling;
a drive comprising a drive wheel and a control unit, wherein the drive wheel abuts the first wheel; and
a securing element configured to couple an item to the first positioner;
wherein the drive wheel is configured to cause the first wheel to rotate; the control unit is configured to control the drive wheel; the securing element coupling is configured to selectively secure the securing element; and the securing element comprises one or more bearings configured to abut and allow rotation of an item.

2. The apparatus of claim 1, further comprising a controller configured to communicate with the control unit.

3. The apparatus of claim 2, wherein the controller comprises a pedal.

4. The apparatus of claim 1, wherein the first positioner further comprises two positioner plates, the two positioner plates define a wheel space, and the two wheels are located inside the wheel space.

5. The apparatus of claim 4, further comprising a wheel axle, wherein the two positioner plates each defines one or more holes, and the wheel axle couples the first wheel by extending through one of the one or more holes in each positioner plate.

6. The apparatus of claim 1, wherein the drive is configured to adjust power, speed, or a combination thereof applied by the drive wheel in response to a change in resistance to achieve a consistent rotation.

7. The apparatus of claim 1, wherein the securing element coupling comprises a ratcheting element, a cam buckle, a cleat, or a combination thereof.

8. The apparatus of claim 1, wherein the securing element coupling is configured to apply a predetermined tension to the securing element.

9. The apparatus of claim 1, wherein the securing element comprises a strap secured by the securing element coupling.

10. The apparatus of claim 9, wherein the one or more bearings are coupled to the strap; and position of the one or more bearings is fixed, the one or more bearings can be adjusted along a length of the strap, the one or more bearings can be removed and added to the strap, or a combination thereof.

11. The apparatus of claim 1, wherein the one or more bearings comprise at least one bearing wheel.

12. The apparatus of claim 1, further comprising a base, and the first positioner further comprises a positioner rod; wherein the positioner rod and the base are coupled together, and distance between the base and the first positioner is adjustable.

13. The apparatus of claim 1, further comprising an item, wherein the item abuts the first wheel and the securing element.

14. The apparatus of claim 1, further comprising a second positioner and an item, wherein the item abuts the first positioner and the second positioner.

15. The apparatus of claim 14, further comprising a second drive coupled to the second positioner.

16. The apparatus of claim 15, wherein the drive and the second drive communicate with each other, a controller, or a combination thereof.

17. The apparatus of claim 1, wherein the first positioner further comprises one or more spacers, wherein each spacer is configured to prevent the securing element from abutting at least one of the two wheels.

18. The apparatus of claim 1, wherein the first positioner further comprises a second wheel.

19. The apparatus of claim 1, wherein the each of the first wheel and the drive wheel comprise gears.

20. An apparatus comprising:
   a first positioner comprising a first wheel and a securing element coupling;
   a drive comprising a drive wheel and a control unit; and
   a securing element configured to couple an item to the first positioner;
   wherein the drive wheel is configured to cause the first wheel to rotate; the control unit is configured to control the drive wheel; the securing element coupling is configured to selectively secure the securing element; and the securing element comprises one or more bearings configured to abut and allow rotation of an item.

21. The apparatus of claim 20, wherein the drive further comprises two or more drive wheel extenders that are able to transmit movement from the drive wheel to the first wheel.

\* \* \* \* \*